(12) United States Patent
Bonn et al.

(10) Patent No.: US 6,236,119 B1
(45) Date of Patent: May 22, 2001

(54) DEVICE FOR DETERMINING THE ANGULAR POSITION OF THE STEERING WHEEL IN A MOTOR VEHICLE

(75) Inventors: Helmut Bonn, Haibach; Gerhard Hössbacher, Aschaffenburg; Ulrich Zawidzki, Sulzbach, all of (DE)

(73) Assignee: Petri AG, Aschaffenburg (DE)

( * ) Notice: Subject to any disclaimer, the term of this patent is extended or adjusted under 35 U.S.C. 154(b) by 0 days.

(21) Appl. No.: 09/297,168

(22) PCT Filed: Nov. 11, 1997

(86) PCT No.: PCT/DE97/02675

§ 371 Date: Apr. 26, 1999

§ 102(e) Date: Apr. 26, 1999

(87) PCT Pub. No.: WO98/21070

PCT Pub. Date: May 22, 1998

(30) Foreign Application Priority Data

Nov. 11, 1996 (DE) .............................................. 196 47 705

(51) Int. Cl.⁷ ...................................................... G01B 7/30
(52) U.S. Cl. ........................ 307/10.1; 180/400; 280/5.51; 701/41
(58) Field of Search .......................... 307/10.1; 180/400; 341/15; 701/41; 73/1.75; 280/5.51

(56) References Cited

U.S. PATENT DOCUMENTS

| 5,611,704 | 3/1997 | Kamizono et al. ........... 439/164 |
| 5,646,523 | * 7/1997 | Kaiser et al. .................... 180/400 |
| 5,668,722 | * 9/1997 | Kaufmann et al. .............. 701/41 |
| 5,819,194 | * 10/1998 | Hara et al. ..................... 701/89 |
| 6,082,171 | * 7/2000 | Wiggenhagen ................. 73/1.75 |

FOREIGN PATENT DOCUMENTS

| 39 03 359 A1 | 8/1990 | (DE) . |
| 39 39 905 A1 | 6/1991 | (DE) . |
| 40 22 837 A1 | 1/1992 | (DE) . |
| 41 01 163 C1 | 5/1992 | (DE) . |
| 41 28 159 A1 | 2/1993 | (DE) . |
| 41 31 533 A1 | 3/1993 | (DE) . |
| 42 28 719 A1 | 3/1994 | (DE) . |
| 195 15 423 A1 | 11/1995 | (DE) . |
| 296 07 713 U1 | 9/1996 | (DE) . |
| 0 087 138 B1 | 8/1983 | (EP) . |
| 0 377 097 A1 | 7/1990 | (EP) . |
| 0377 097 B1 | 7/1990 | (EP) . |
| 0 460 417 A1 | 12/1991 | (EP) . |
| WO 89/07058 | 8/1989 | (WO) . |

* cited by examiner

Primary Examiner—Albert W. Paladini
(74) Attorney, Agent, or Firm—Christie, Parker & Hale, LLP

(57) ABSTRACT

A device for determining the angular position of the steering wheel in a motor vehicle uses a steering angle sensor and an electronic evaluation device for determining the angular position. The steering angle sensor is integrated in a contact unit for transmitting energy and data from stationary sub-assemblies of the vehicle to the steering wheel and vice versa. Preferably, the steering angle sensor is disposed as part of a stator and rotor in a contact unit which operates in a contactless manner and comprises the stator and the rotor. In this way, the steering angle sensor does not require any additional space for installation and costs are reduced.

23 Claims, 5 Drawing Sheets

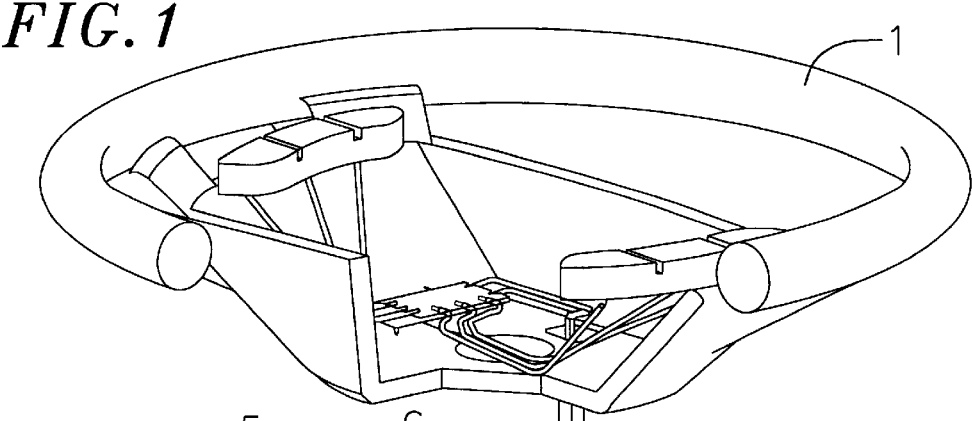
FIG.1
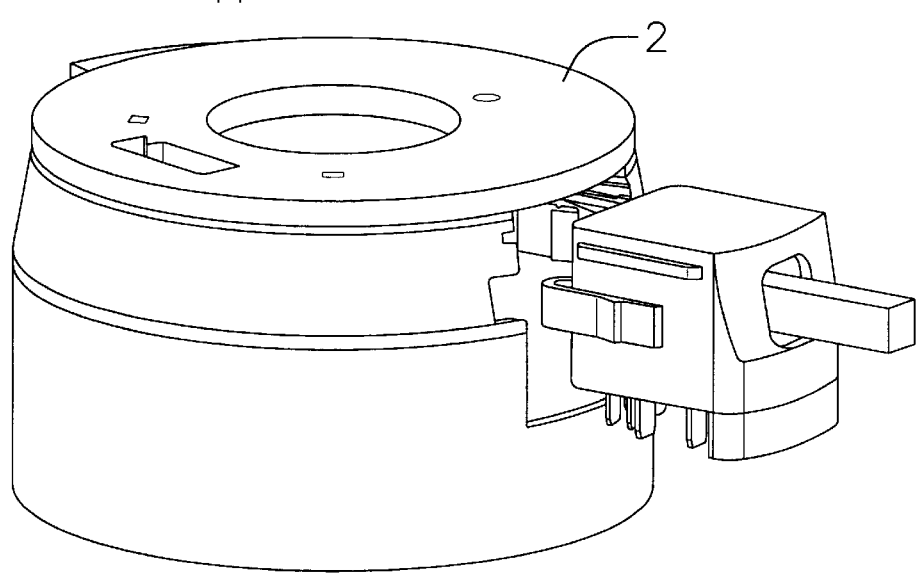
FIG.1a FIG.1b
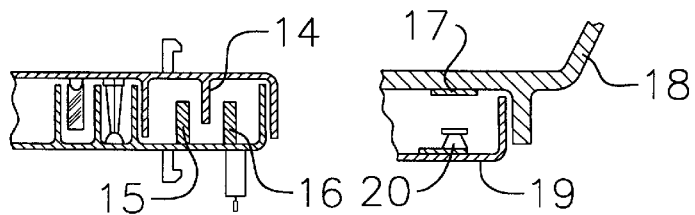

DEVICE FOR DETERMINING THE ANGULAR POSITION OF THE STEERING WHEEL IN A MOTOR VEHICLE

FIELD OF THE INVENTION

The invention relates to a device for determining the angular position of the steering wheel in a motor vehicle.

BACKGROUND OF THE INVENTION

Inductive and optical steering angle sensors are known to determine the angular position of the steering wheel. The measured values which can be determined with these means are supplied to an electronics circuit on the output side for determining the steering angle. The known steering angle sensors are fixed as a separate part underneath the drop arm switch in the vehicle. The drawback with this arrangement is that additional structural space is required for the steering angle sensor and additional costs are incurred.

SUMMARY OF THE INVENTION

The object of the invention is to allow the determination of the steering angle without additional structural space and with lower costs.

This is achieved according to a device for determining the angular position of the steering wheel in a motor vehicle by using a steering angle sensor and an electronic evaluation device for determining the angular position. According to the invention, the steering angle sensor is integrated in a contact unit for transferring energy and data from stationary structural groups of the motor vehicle to the steering wheel and vice versa.

More particularly, the steering angle sensor is mounted as a component part of the stator and rotor in a contact unit having a stator and rotor and operating in contactless manner. Through this integration of the steering angle sensor into the contact unit which is present in any case, it is possible both to reduce the structural space and costs as required. The steering angle sensor and the different types of contact units are combined into one system and can thus be supplied as a structural unit to the automobile industry.

In a first embodiment, an optical steering angle sensor is provided which has on the rotor or stator a bar code representing the angular position of the steering wheel. The bar code is associated with a structural group on the stator or rotor for detecting and transferring the angular position determined by the bar code. The bar code can be injection moulded on the rotor or stator by the 2-component technique. A pulsating light source is preferably associated with the bar code so that the unlit bar code is illuminated pulsating in operation thereby saving energy. With the arrangement of the optical steering angle sensor in an optical contact unit the bar code is lit up by the LED which is provided for the energy transfer so that additional lighting is not required.

As a structural group for detection and transfer, at least one transmitter and receiver is provided which are mounted id radially spaced from each other in a ring on the stator and between these a partition wall is provided on which the bar code is attached. The transmitter, receiver and partition wall are preferably arranged concentric relative to each other or lie opposite one another in the axial direction.

The transmitter and receiver preferably operate in the infrared wavelength range. The signals are transferred from the infrared transmitter to the infrared receiver via the code track.

The steering angle is measured incrementally in a known way, i.e. a micro-controller counts the impulses of the reflected light beams and from this forms the steering angle. Thus a dependence is produced for the permissible rotational speed and micro-controller contact.

In a further embodiment, it is proposed that a CCD element with a magnifying glass is provided as a structural group for the detection and transfer. Greater axial and radial tolerances can be compensated by the focusing thereby achieved.

With this optical steering angle sensor the bar code thus receives information on the angular position of the steering wheel. This data is detected by means of the diodes or CCD element and transferred to the electronics (known per se) on the output side. The angular position is calculated there from the coded measured value.

In one embodiment, it is proposed that the bar code is attached to a ring-shaped carrier with which the CCD elements are associated in the radial direction. It is however also possible to provide the bar code on a data ring for the multi-functions in the steering wheel with which the CCD elements are associated.

Apart from the radial association of the bar code and CCD elements, an axial association is also possible. Thus in one embodiment it is proposed that the bar code is attached to the steering wheel and the CCD elements axially on the stator.

In a further embodiment, a telemetric steering angle sensor is provided which has on the stator or rotor, a ring-shaped transmitter aerial (or module) which is associated with a ring-shaped receiver aerial (or module) on the rotor or stator whereby the axes of the rings run in different directions. Preferably, the transmitter aerial is fixed on the stator and its axis runs in the direction of the steering column axis, and the receiver aerial is fixed on the rotor and its axis runs at an angle to the steering column axis.

Thus with this embodiment, the ring-shaped transmitter and receiver aerials have a different spacing over their circumference. Particularly in the case of the last-mentioned embodiment, the receiver aerial fixed on the rotor executes a tumbling motion relative to the transmitter aerial. Through rotation of the rotor, a rising magnetic field is produced starting from a zero point and this is converted into angular degrees through the attached electronics.

In another embodiment, an inductive steering angle sensor is provided which has on the stator and rotor, respectively, a resistance path attached to an alternating current source and a collector path running in the same direction associated with a probe on the rotor and stator, respectively, for transferring data from the resistance path to the collector path. The probe provided is one suitable for the capacitive decline of the displacement current. The displacement current is transferred to the collector path and supplied from there to the evaluator electronics.

In an embodiment of the inductive steering angle sensor, the resistance and collector paths are mounted inside on the ring-shaped stator and the probe is provided outside on the rotor which is concentric with the stator.

In another embodiment of the inductive steering angle sensor, the probe is attached directly on the steering wheel hub or on a plastic ring fixed on the steering wheel. The resistance and collector paths are fixed axially opposite one another on the stator.

A further embodiment of the steering angle sensor is characterised in that a metal ring is mounted in the rotor part of the contact unit and is associated with an echo sensor in the stator part of the contact unit whereby the metal ring has a continuously rising width and is formed as a magnetic ring. With rotation of the steering wheel and thus of the metal ring, a different sized echo voltage is produced in dependence on the rotary angle and is then used as a measure for the rotary angle.

The changing width of the metal ring is preferably achieved through an inclined lower edge.

Contact units, in which the steering angle sensor is mounted, preferably provide inductive or telemetric or optical contact units, whereby the steering angle sensors are preferably provided in the identical contact units. It is however also possible to provide throughout, for example, optical steering angle sensors in inductive or telemetric contact units or inductive or telemetric steering angle sensors in the other said contact units.

In order to reliably prevent the optical component parts from misting up in the case of an optical steering angle sensor or with an arrangement of the steering angle sensor in an electrical contact unit, moisture extraction means or a metal ring can be provided on the optical transfer section. These can be provided directly on the optical transfer section or in a labyrinth which surrounds the optical transfer section.

BRIEF DESCRIPTION OF THE DRAWINGS

The invention will now be explained by way of example with reference to the embodiments shown in the drawings in which:

FIG. 1 shows a steering wheel assembly with an optical steering angle sensor;

FIG. 1a, shows a cut-out section of the steering wheel arrangement with a second embodiment of the steering angle sensor;

FIG. 1b shows a cut-out section of the steering wheel arrangement with a third embodiment of the steering angle sensor;

DETAILED DESCRIPTION OF THE PREFERRED EMBODIMENT

Figure 2:
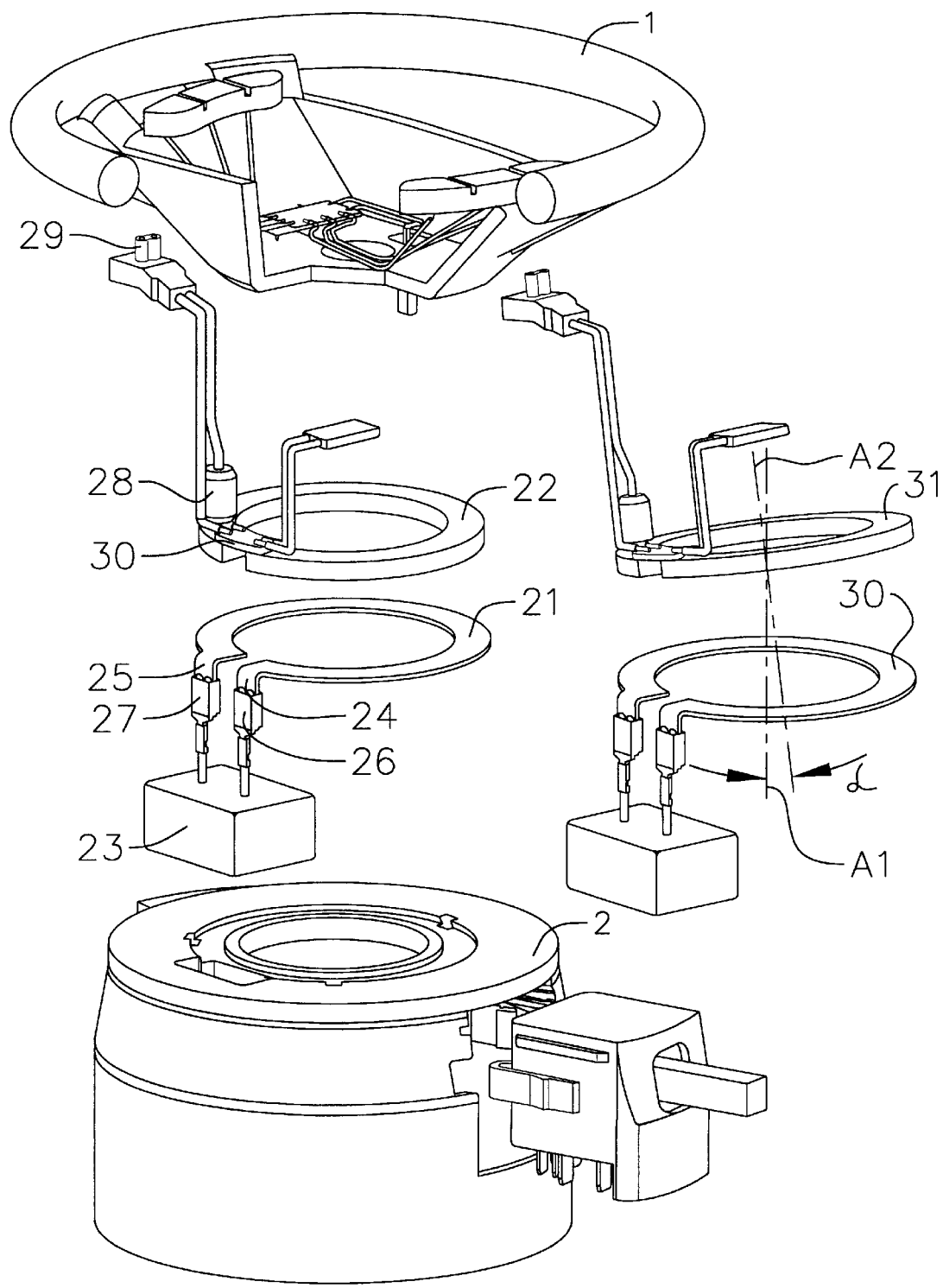
FIG. 2 shows a steering wheel arrangement with a telemetric contact unit and separate telemetric steering angle sensor integrated therein.

FIG. 1 shows a multi-function steering wheel 1 and a stationary steering column trim 2 which have structural groups between which energy and data are to be transferred. To this end light emitter diodes (LED) 4 are arranged in a ring as a transmitter on a stator 3 of a contact unit. The stator 3 is fixed on the steering column trim 2 by means of fixing hooks 3a.

A rotor 5 on which photocells 6 are mounted in a ring as receiver is associated with the stator 3. The LED 4 of the stator 3 and the photocells 6 of the rotor 5 thereby form a transfer section in a first current circuit in which energy and data are transferred from the stationary structural groups of the vehicle to the steering wheel. The rotor 5 is fixed on the steering wheel by means of fixing hooks 5a. The stator 3 and rotor 5 are circular and have an external edge 7 and 8 respectively.

Furthermore a light diode 9 is provided on the rotor 5 as a transmitter which is embedded in a clear plastic ring 10 which is likewise fixed on the rotor 5. A photocell 11 on the stator 3 is associated as a receiver with the light diode 9. The light diode 9 with the plastic ring 10 and the photocell 11 form the transfer section in a second current circuit in which data is transferred from the steering wheel to the stationary structural groups.

The structural groups described above represent the contact unit by means of which energy and data are transferred contact-free from stationary structural groups to the steering wheel and data is transferred from the steering wheel to the stationary structural groups. The steering angle sensor is provided additionally in the contact unit.

In FIG. 1, in a first embodiment of the steering angle sensor an intermediate wall 12 is provided running parallel to the external edge 7 and provided with a bar code. This code contains the information on the different angular positions of the steering wheel. This information is detected by means of a CCD element 13 which is fitted with a magnifying glass and is fixed on the stator 3. The lighting for the bar code is supplied by the LED 4 which are provided for transferring energy to the steering wheel. The steering angle is then determined by means of an electronic circuit known per se.

With this embodiment the bar code can also be applied on the plastic ring 10 wherein the CCD element is then mounted in the position shown in chain-dotted lines.

In the second embodiment of the steering angle sensor according to FIG. 1a reflection light beams are provided. A partition wall 14 is provided running parallel to the edge 7 and likewise equipped with a bar code and permeable to the radiation used, preferably infrared radiation. This bar code is associated with a transmitter 15 and receiver 16 which are fixed on the stator 3 and adjoin opposite sides of the partition 14, i.e. the bar code lies between the transmitting and receiving diode. The infrared transmitting diode transfers the signals through the coding to the infrared receiving diode. This is attached to a known electronic circuit with a calculator in which the angular position of the steering wheel is determined.

Whereas in the previous embodiments the bar code is on one side and the CCD elements or transmitter and receiver are on the other and are radially opposite one another, with the third embodiment according to FIG. 1b, an axial arrangement is provided. Thus a ring-shaped bar code 17 is placed on the underneath of the steering wheel hub 18. A CCD element 20 is mounted on a stator 19 axially opposite the bar code.

In the embodiment of FIG. 2 a multi-function steering wheel 1 and a stationary steering column trim 2 are shown between which energy and data are transferred by means of a contact unit in the form of a close field telemetry system. This has a transmitter module 21 and a receiver module 22. The transmitter module is connected to a control electronics 23 which is fixed in the steering column trim 2. The transmitter module 21 consists of an open ring-shaped brass punched part which has on its open side connecting tabs 24, 25 which are bent round 90 degrees relative to the ring face and are connected to plug contacts 26, 27. The transmitter module 21 is connected to the control electronics by means of these plug contacts.

A The receiver module 22 which likewise consists of an open ring-shaped brass punched part supports on its open side an evaluator electronics 28 which is provided with a socket 29 for connection with a plug (not shown) in the steering wheel 1. Data and energy for an airbag and other functional groups are transferred by means of these modules in the contact unit.

The steering angle sensor is additionally mounted in this contact unit. This sensor has a transmitter module 30 and a receiver module 31. The transmitter module 30 and the receiver module 31 are inclined relative to each other deviating from the transmitter module 21 and the receiver module 22 which are mounted at the same spacing from each other over the entire circumference. The axis A1 of the transmitter module 30 thereby runs in this embodiment in the direction of the axis of the steering column, while the axis A2 of the receiver module 31 deviates from the direction of the axis of the steering column. With rotation of the steering wheel, the receiver module 31 therefore executes a tumbling motion. Starting from a zero point, a rising magnetic field is produced which characterises the rotational angle of the steering wheel. The transmitter module 30, as a component part of the stator of the contact unit, transfers in contactless manner the data to the receiver module 31 of the rotor of the contact unit. The different magnetic field which depends on the steering angle is converted into angular degrees by means of a known electronics unit with calculator.

Figure 3:
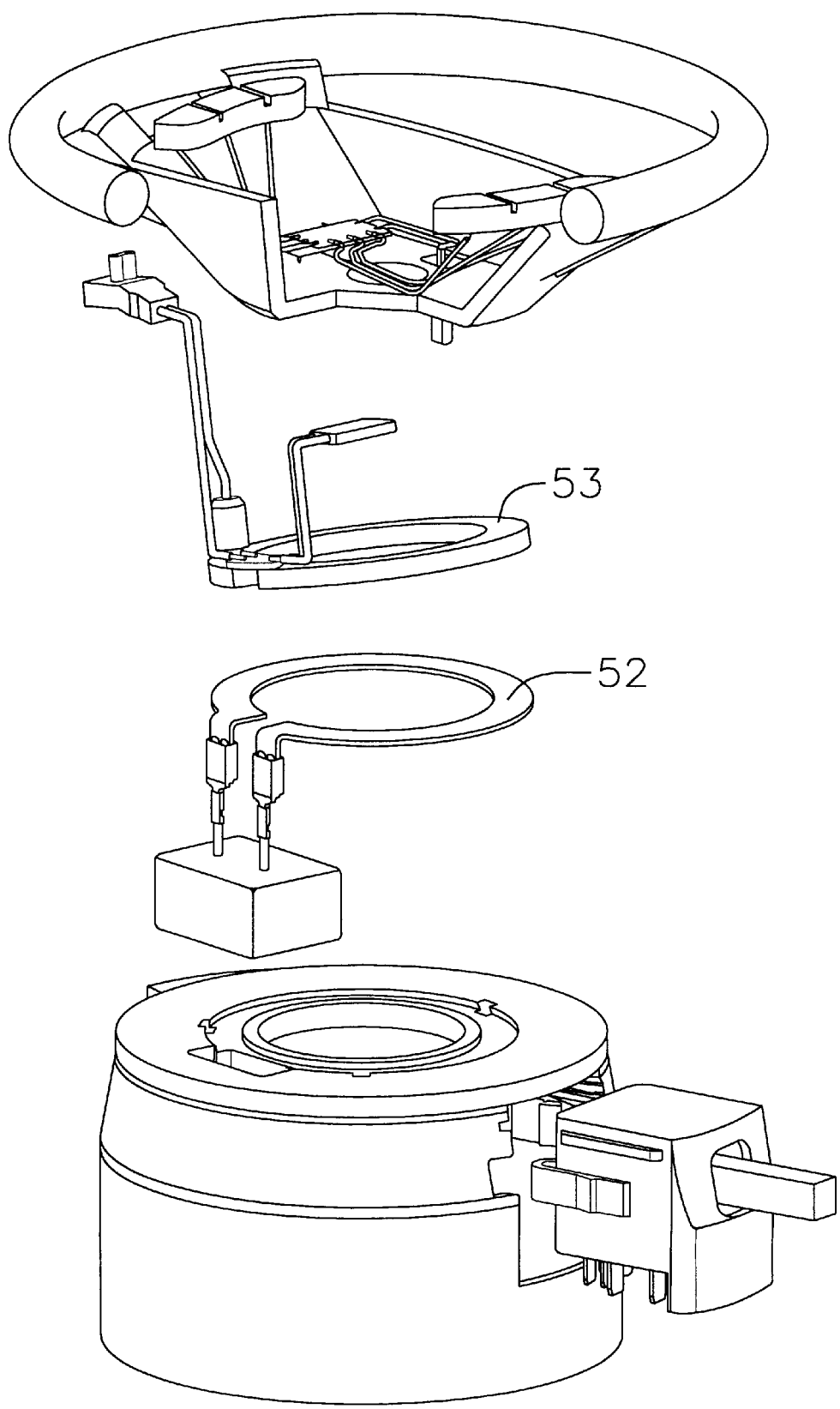
FIG. 3 shows a steering wheel arrangement with a telemetric contact unit with integrated steering angle sensor.

FIG. 3 shows a variation of the embodiment of FIG. 2. With this variation only one transmitter module 52 and one receiver module 53 are provided which serve both for the general energy and data transfer and as steering angle sensor.

Figure 4:
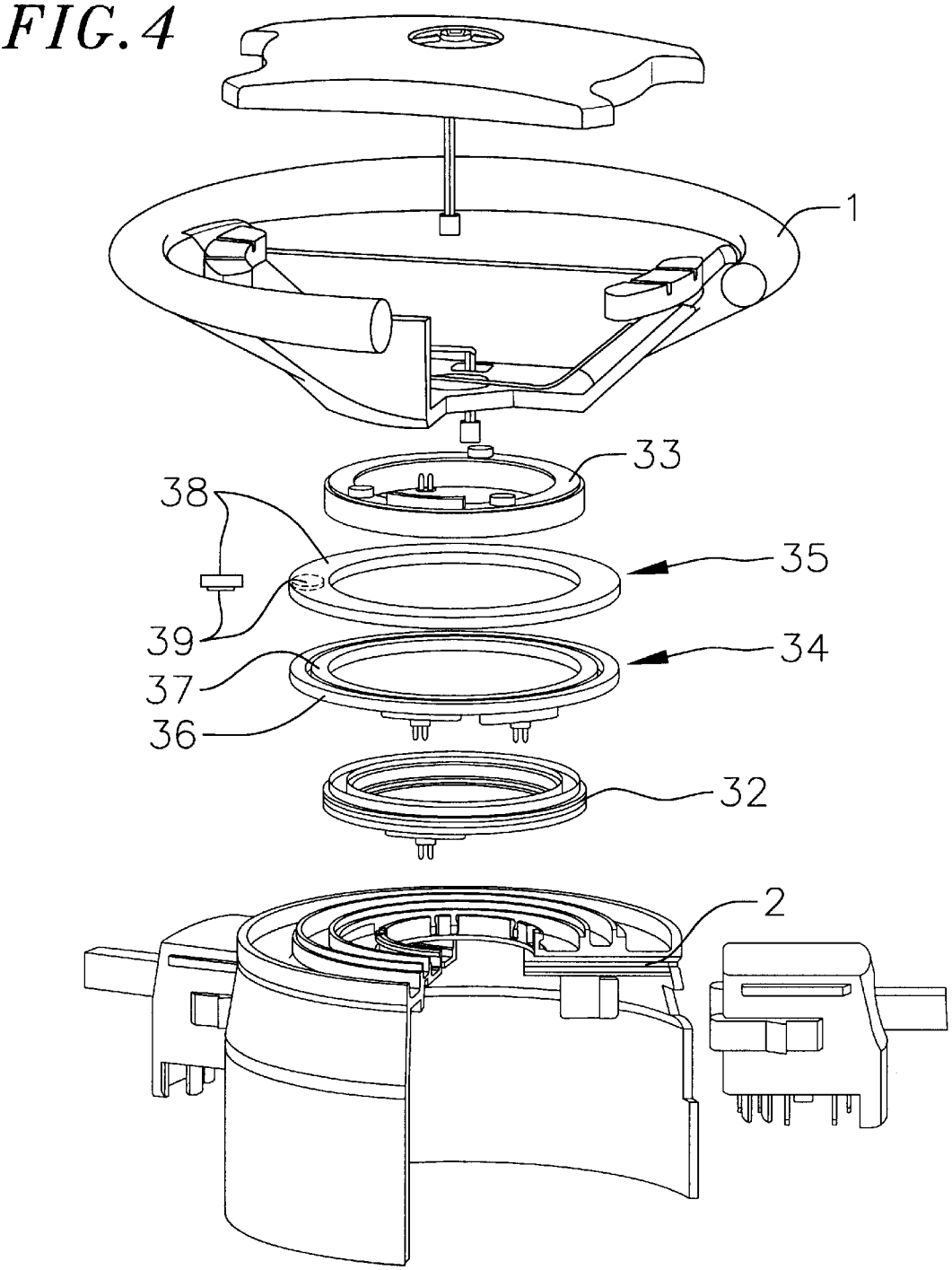
FIG. 4 shows a steering wheel arrangement with inductive contact unit and integrated steering angle sensor.

With the embodiment of FIG. 4 a coil system is provided for transferring energy and data from stationary structural groups of the vehicle to the steering wheel and data from here to the stationary structural groups. To this end, a first current circuit with a first coil 32 is mounted stationary in the steering column trim 2 and this coil 32 is associated with a second coil 33 on the steering wheel 1. These coils form the contact unit which operates in contactless manner.

The steering angle sensor is integrated in this contact unit. It has a stationary structural group 34 which is likewise fixed on the steering column trim 2. This stationary structural group is associated with a structural group 35 which is fixed on the steering wheel 1. The stationary structural group 34 has a ring-shaped resistance path 36 and, concentric with this, a ring-shaped collector path 37 which has a smaller diameter than the resistance path. The structural group 35 fixed on the steering wheel consists of a plastic ring 38 on which a probe 39 is fixed. The resistance path 36 is fed with an alternating current. The position of the probe is changed with the rotation of the steering wheel relative to both the resistance and collector paths. By means of the probe, a displacement current is capacitively removed. The size of the displacement current depends on the relevant position of the probe in the displacement direction. The displacement current is transferred by the probe to the collector path 37 and then evaluated. The charging displacements added up in a defined time interval are a measure for the position of the probe.

Figure 4B:
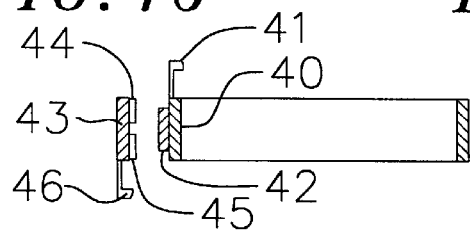
FIG. 4b shows a section through a third embodiment of the steering angle sensor according to FIG. 4.
Figure 4A:
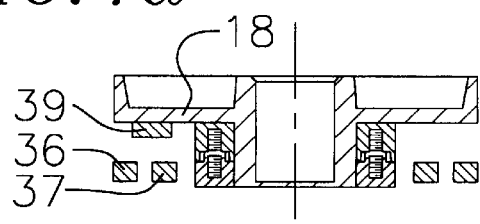
FIG. 4a shows a section through a second embodiment of the steering angle sensor according to FIG. 4.

The construction of the steering angle sensor shown in FIG. 4a differs from the construction in FIG. 4 in that the steering wheel hub 18 is formed so that the probe 39 is fixed directly on the steering wheel hub 18. The additional plastic ring 38 is thereby spared.

Whereas with the previous embodiments of the steering angle sensor, the sensor on the one hand and the resistance and collector paths on the other are axially opposite one another but with the third embodiment of the steering angle sensor shown in FIG. 4b they are radially opposite one another. With this embodiment a plastic, ring-shaped rotor 40 is fixed by hooks 41 on the path of the contact unit provided on the steering wheel 1. A probe 42 is provided on the outside of the rotor 40.

A plastic, ring-shaped stator 43 is provided on the stationary part of the contact unit and concentrically encloses the rotor 40. A resistance path 44 and a collector path 45 are provided on the inside of the stator 43. The stator 43 is fixed on the contact unit by hooks 46. The method of operation corresponds to that of the previous embodiments. The additional advantage of this embodiment is that the steering angle sensor can be readily exchanged in the event of a system failure.

Figure 5:
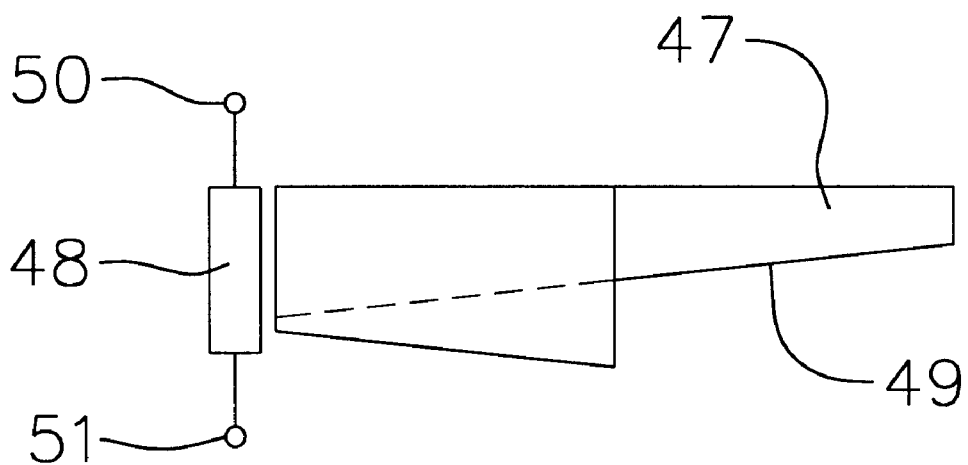
FIG. 5 shows a diagrammatic view of a fourth embodiment of the steering angle sensor with radial signal transfer.

With the embodiment of FIG. 5 a steering angle sensor is shown for the radial signal transfer. With this, a metal ring 47 is mounted in the rotor part of the contact unit and is associated with an echo sensor 48 in the stator part of the contact unit. The metal ring has a continuously rising width which in the present embodiment is achieved through an inclined lower edge 49. The metal ring is formed as a magnetic ring so that the echo sensor, with the rotation of the metal ring is traversed by a continuously changing magnetic field. The echo voltage generated in the echo sensor consequently changes in dependence on the turning angle.

Figure 6:
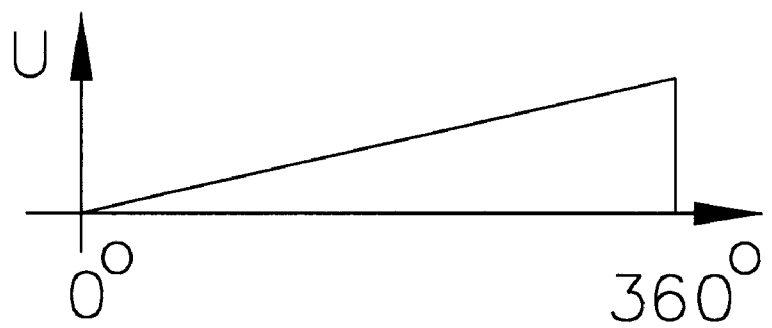
FIG. 6 shows the signal obtained with the steering angle sensor according to FIG. 5 after one revolution of the steering wheel.

In FIG. 6 the path of the echo voltage is shown for a full revolution of the steering wheel. The echo voltage is removed at the contacts 50, 51 by the echo sensor and processed in a known way to represent the steering angle.

What is claimed is:

1. A device for determining the angular position of a steering wheel in a motor vehicle having one of an inductive unit, a telemetric unit and an optical contact unit for transferring energy and data from stationary structural groups of the motor vehicle to the steering wheel and vice versa in a contactless manner, the one of an inductive, telemetric and optical unit including a stator and a rotor;
   a steering angle sensor and an electronic evaluation device for determining the angular position of the steering wheel;
   wherein the steering angle sensor is mounted as a constituent part of the stator and rotor of the one of an inductive, telemetric and optical unit for transferring energy and data from stationary structural groups of the motor vehicle to the steering wheel and vice versa in a contactless manner.

2. The device according to claim 1 wherein the steering angle sensor includes an optical steering angle sensor having a bar code representing the angular position of the steering wheel and a structural group for detecting and transferring the angular position determined by means of the bar code, wherein the bar code is on one of either the stator or the rotor and the structural group is on the other one of the rotor or stator.

3. The device according to claim 2 wherein the bar code is injected by a 2-component technique.

4. The device according to claim 2 further comprising a pulsating light source wherein the bar code is illuminated by the pulsating light source.

5. The device according to claim 2 wherein the structural group includes at least one transmitter and receiver, and wherein the transmitter and receiver are arranged at a distance from each other on the stator and the bar code is applied to a partition wall between the transmitter and receiver.

6. The device according to claim 5 wherein the transmitter, receiver and partition wall are arranged concentric with each other.

7. The device according to claim 5 wherein the transmitter, receiver and partition wall are arranged axially opposite one another.

8. The device according to claim 2 wherein the structural group includes at least one CCD element with a magnifying glass.

9. The device according to claim 8 wherein the bar code is on a ring-shaped carrier located radially with respect to the CCD element.

10. The device according to claim 8 wherein the bar code is on a data ring for the multi functions in the steering wheel.

11. The device according to claim 10 wherein the bar code is attached to the steering wheel and the CCD element is attached on the stator and is located axially with respect to the bar code.

12. The device according to claim 1 wherein the steering angle sensor includes a telemetric steering angle sensor having a ring-shaped transmitter aerial and a ring-shaped receiver aerial, and wherein the transmitter aerial is on one of either the stator or the rotor and the ring-shaped receiver aerial is on the other one of the rotor or the stator and wherein the axes of the rings run in different directions.

13. The device according to claim 12 wherein the transmitter aerial is fixed on the stator and the axis runs in the direction of a steering column, and the receiver aerial is fixed on the rotor and the axis runs at an angle to the axis of the steering column.

14. The device according to claim 1 wherein the steering angle sensor includes an inductive steering angle sensor having a resistance path attached to an alternating current voltage source, a collector path running in the same direction as the resistance path, and a probe, and wherein the resistance path and the collector path are on the same one of either the stator or rotor and the probe is on the other one of the rotor or stator.

15. The device according to claim 14 wherein the probe is provided for the capacitative decline of a displacement current.

16. The device according to claim 14 wherein the resistance and collector path are mounted inside on the ring-shaped stator and the probe is provided outside on the rotor lying concentric with the stator.

17. The device according to claim 14 wherein the probe is fixed directly on one of the steering wheel hub and on a plastic ring fixed on the steering wheel and that the resistance and collector path are fixed axially opposite one another on the stator.

18. The device according to claim 1 wherein the steering angle sensor includes a metal ring mounted in the rotor part of the unit for transferring energy and data from stationary structural groups of the motor vehicle to the steering wheel and vice versa and an echo sensor in the stator part of the unit for transferring energy and data from stationary structural groups of the motor vehicle to the steering wheel and vice versa wherein the metal ring has a continuously rising width and is formed as a magnetic ring.

19. The device according to claim 18 wherein the metal ring has an inclined lower edge.

20. The device according to claim 1 further comprising one of a moisture extraction means and a metal ring and further comprising an optical transfer path, wherein the one of a moisture extraction means and a metal ring is provided on the optical transfer path.

21. The device according to claim 20 wherein one of the moisture extraction means and the metal ring is provided in a labyrinth which encloses the optical transfer path.

22. A device for determining the angular position of a steering wheel in a motor vehicle comprising:
 a unit for transferring energy and data from stationary structural groups of the motor vehicle to the steering wheel and vice versa in a contactless manner, the unit including a stator, a rotor and a means for transferring energy and data from stationary structural groups of the motor vehicle and vice versa in a contactless manner, said means mounted to the rotor and stator;
 a steering angle sensor and an electronic evaluation device coupled to the steering wheel sensor for determining the angular position of the steering wheel;
 wherein the steering angle sensor is mounted as a constituent part of the stator and rotor of the unit.

23. The device of claim 22 wherein the stator and rotor have mounting portions in opposed relation to each other and upon which components of the means for transferring energy and data are mounted in opposed relation to each other and upon which components of the steering angle sensor are mounted in opposed relation to each other.

* * * * *